(12) United States Patent
Park

(10) Patent No.: US 11,605,844 B2
(45) Date of Patent: Mar. 14, 2023

(54) CATHODE RECYCLING OF END-OF-LIFE LITHIUM BATTERIES

(71) Applicant: Alliance for Sustainable Energy, LLC, Golden, CO (US)

(72) Inventor: Kyusung Park, Greenwood Village, CO (US)

(73) Assignee: Alliance for Sustainable Energy, LLC, Golden, CO (US)

(*) Notice: Subject to any disclaimer, the term of this patent is extended or adjusted under 35 U.S.C. 154(b) by 139 days.

(21) Appl. No.: 17/087,303

(22) Filed: Nov. 2, 2020

(65) Prior Publication Data

US 2021/0226263 A1 Jul. 22, 2021

Related U.S. Application Data

(60) Provisional application No. 62/929,546, filed on Nov. 1, 2019.

(51) Int. Cl.
| | |
|---|---|
| *H01M 10/00* | (2006.01) |
| *H01M 10/54* | (2006.01) |
| *H01M 4/62* | (2006.01) |
| *B01D 11/02* | (2006.01) |
| *H01M 10/42* | (2006.01) |
| *H01M 10/0525* | (2010.01) |
| *H01M 4/38* | (2006.01) |
| *H01M 4/505* | (2010.01) |
| *H01M 4/525* | (2010.01) |

(52) U.S. Cl.
CPC ......... *H01M 10/54* (2013.01); *B01D 11/0203* (2013.01); *H01M 4/382* (2013.01); *H01M 4/505* (2013.01); *H01M 4/525* (2013.01); *H01M 4/622* (2013.01); *H01M 10/0525* (2013.01); *H01M 10/4242* (2013.01); *H01M 10/4285* (2013.01)

(58) Field of Classification Search
CPC ........... H01M 2004/028; H01M 4/525; H01M 10/4285; H01M 4/622; Y02W 60/10; Y02E 60/10
See application file for complete search history.

(56) References Cited

U.S. PATENT DOCUMENTS

| | | | |
|---|---|---|---|
| 5,540,741 A | 7/1996 | Gozdz et al. | |
| 2011/0017528 A1* | 1/2011 | Kumar | H01M 4/366 429/231.95 |
| 2016/0372802 A1* | 12/2016 | Chiang | H01M 10/54 |
| 2019/0165419 A1* | 5/2019 | Moriishi | H01M 12/06 |

OTHER PUBLICATIONS

Aptel, A. and Clifton, M., "Ultrafiltration," Laboratoire de Genie Chimique (CNRS L.A. 192), in Synthetic Membranes; Science, Engineering and Applications, P. M. Bungay, K. H. Londsdale, and M. N. de Pinho, Eds., D. Reidel, Dordrecht, 1986, 57 pages.
Bottino, A. et al., "Solubility Parameters of Poly(vinylidene fluoride)," Wiley Journal of Polymeer Science: Part B: Polymer Physics, vol. 26, 1988, 10 pages.

(Continued)

*Primary Examiner* — Cynthia H Kelly
*Assistant Examiner* — Monique M Wills
(74) *Attorney, Agent, or Firm* — Sam J. Barkley

(57) ABSTRACT

Disclosed herein are improved methods and devices for recycling lithium cathodes from batteries.

11 Claims, 9 Drawing Sheets

(56) References Cited

OTHER PUBLICATIONS

Chen, M. et al., "Recycling End-of-Life Electric Vehicle Lithium-Ion Batteries," Joule, Oct. 2019, https://doi.org/10.1016/j.joule.2019.09.014, 25 pages.

Dai, Q. et al., "EverBatt: A Closed-loop Battery Recycling Cost and Environmental Impacts Model," Argonne National Laboratory, Energy Systems Division, ANL-19/16, Apr. 2019, 88 pages.

Gao, X. et al., "Promoting solution phase discharge in Li-O2 batteries containing weakly solvating electrolyte solutions," Nature Materials, vol. 15, Aug. 2016, 9 pages.

Han, C. et al., "Organic quinones towards advanced electrochemical energy storage: recent advances and challenges," Journal of Materials Chemistry A, vol. 7, 2019, 38 pages.

Harper, G. et al., "Recycling lithium-ion batteries from electric vehicles," Nature, vol. 575, 2019 12 pages.

Marshall, J. et al., "Disassembly of Li Ion Cells—Characterization and Safety Considerations of a Recycling Scheme," Metals, vol. 10, No. 773, 2020, doi:10.3390/met10060773, 21 pages.

Miao, L. et al., "The structure-electrochemical proper relationship of quinone electrodes for lithium-ion batteries," RSC Phys. Chem. Chem. Phys, vol. 20, 2018, 7 pages.

Shi, Y. et al., "Ambient-Pressure Relithiation of Degraded $Li_xNi0.5Co0.2Mn0.3O_2$ ($0<x<1$) via Eutectic Solutions for Direct Regeneration of Lithium-Ion Battery Cathodes," Advanced Energy Materials, vol. 9, 2019, 9 pages.

Wang, T. et al., "Direct Recycling of Spent NCM Cathodes through Ionothermal Lithiation," Advanced Energy Materials, vol. 10, 2020, 6 pages.

Yang, T. et al., "An Effective Relithiation Process for Recycling Lithium-Ion Battery Cathode Materials," Advanced Sustainable Systems, vol. 4, 2020, 6 pages.

Zheng, P., "The Design and Optimization of a Lithium-ion Battery Direct Recycling Process," https://vtechworks.lib.vt.edu/handle/10919/93212, Aug. 21, 2019, 2 pages.

* cited by examiner

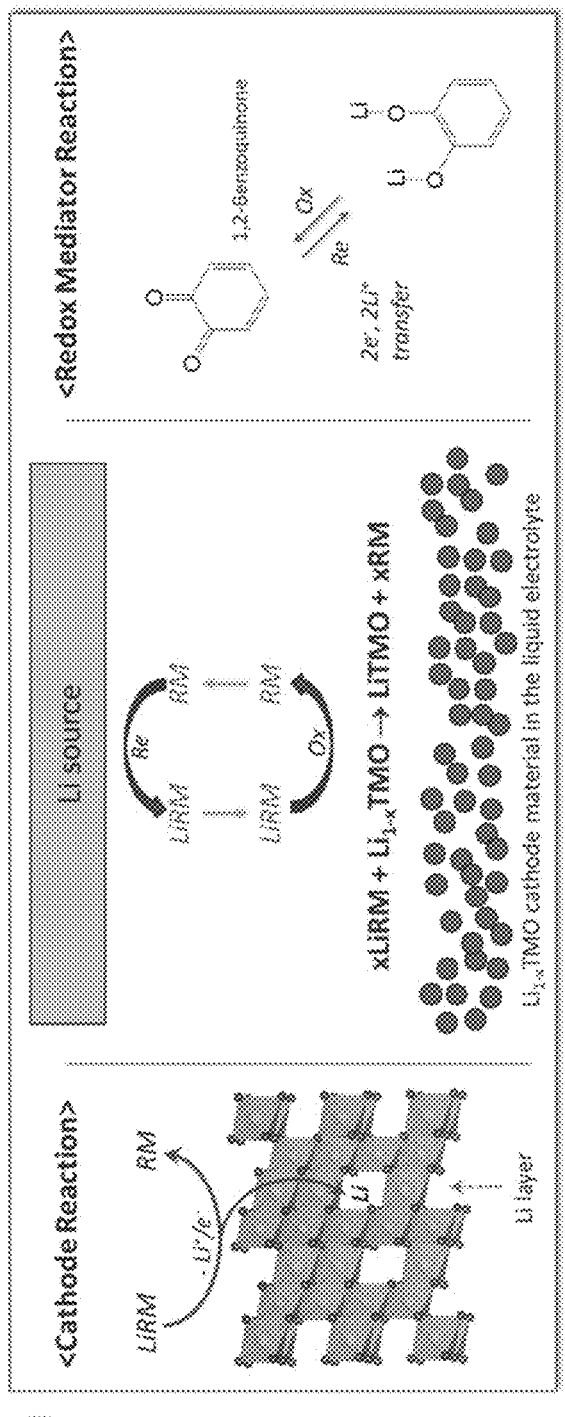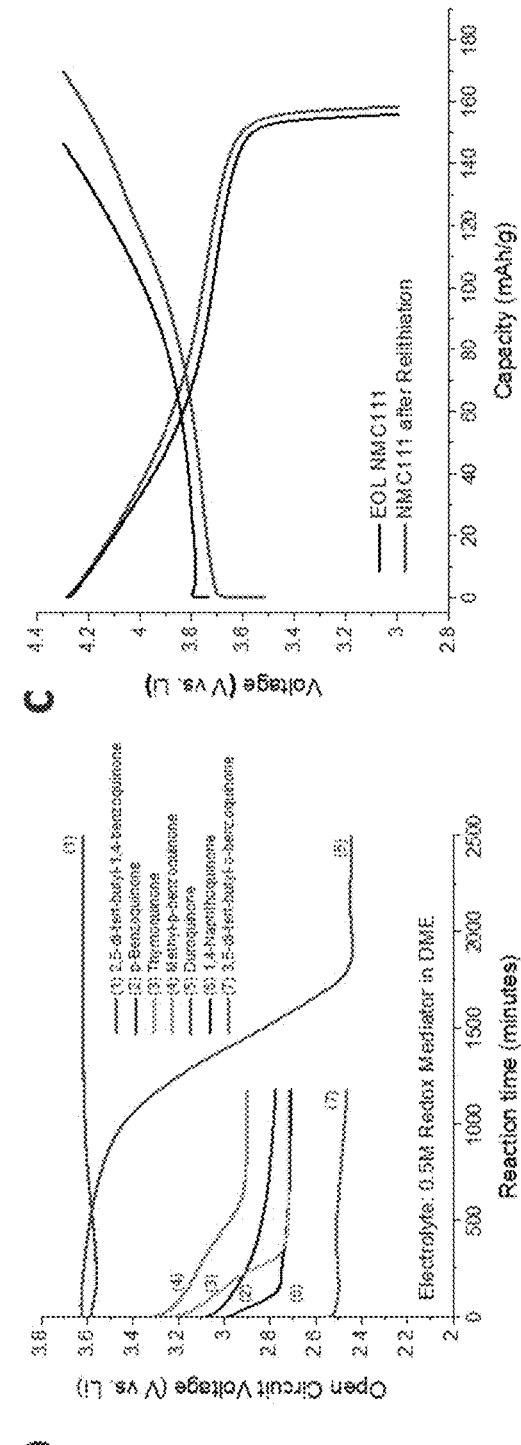
FIGs. 1a, 1b, 1c

CATHODE RECYCLING OF END-OF-LIFE LITHIUM BATTERIES

CROSS-REFERENCE TO RELATED APPLICATION

This application claims priority under 35 U.S.C. § 119 to U.S. provisional patent application No. 62/929,546 filed on 1 Nov. 2020, the contents of which are hereby incorporated in their entirety.

CONTRACTUAL ORIGIN

The United States Government has rights in this invention under Contract No. DE-AC36-08GO28308 between the United States Department of Energy and Alliance for Sustainable Energy, LLC, the Manager and Operator of the National Renewable Energy Laboratory.

BACKGROUND

It is expected that there will be a lot of end-of-life lithium ion battery wastes from consumer electronics, electric vehicles, and large-scale energy storage systems. It is urgent to find a promising method to recycle the batteries, especially the cathode materials as the cathode materials have the highest materials cost and engineering values in the battery.

While electric vehicles (EVs) help reduce greenhouse gas emissions, their use also poses several critical concerns. Since the battery cathode is made of some critical and key elements such as cobalt, nickel, manganese, and lithium, shortage of those elements and disruption of the supply chain will be a major concern for mass production. Furthermore, the EV battery packs will generate a significant amount of waste stream after their end-of-life (EOL). The direct cathode recycling tries to address these challenges by recycling and reusing EOL cathode materials. For example, electrochemical method, eutectic molten salt method, and ionothermal method have been proposed to relithiate EOL cathode materials. No high throughput room-temperature powder process currently exists to meet the future direct cathode recycling demands.

Traditional approaches to cathode recycling at the end of life for batteries containing lithium ions is focused primarily on extracting the expensive cobalt element by dissolving the cathode materials in an acid bath. However, this is a very cost and energy intensive process and through its implementation the cathode loses its physical properties including its shape, size, and structure.

There are several current approaches to recycling lithium cathodes in batteries at their end-of-life. The efforts are directed towards putting lithium ions back into the crystal structure include putting some lithium sources and the spent battery cathode together and heating up to get final materials, but this method is very simple but needs exact lithium vacancy concentrations, which is almost impossible. Using a hydrothermal method which has a very limited scalability, and which is almost impossible to be adopted in the industry. Using a high temperature molten salt bath. This process is also energy and cost intensive.

SUMMARY

Exemplary embodiments of the invention disclosed herein provide devices and methods that improve the recycling of lithium and other chemicals and elements of interest from batteries. In an aspect disclosed herein is a method for recycling lithium cathodes from batteries comprising using a redox mediator. In an embodiment, disclosed herein is a method for recycling lithium from battery cathodes.

Other objects, advantages, and novel features of the present invention will become apparent from the following detailed description of the invention when considered in conjunction with the accompanying drawings.

BRIEF DESCRIPTION OF THE DRAWINGS

FIGS. 1a, 1b, and 1c depict an embodiment of redox-mediator-assisted relithiation of the end-of-life cathode. FIG. 1a depicts Li-deficient end-of-life transition-metal-oxide (TMO) cathode material is relithiated via redox mediator shuttling. FIG. 1b depicts open circuit voltage changes of the half cells with various 0.5 M redox mediators in DME electrolyte. FIG. 1c depicts initial charge/discharge voltage curves of the EOL cathode before and after the relithiation.

FIG. 2a depicts initial charge/discharge voltage curves of the relithiated cathode with X M DTBQ (X=0.1, 0.2, 0.3, and 0.5) in DME for 1 hour. FIG. 2b depicts initial charge/discharge voltage curves of the relithiated cathode with 0.5 M DTBQ in DME for 10, 30, and 60 minutes. FIG. 2c depicts (003) X-ray diffraction peaks of the relithiated cathode with 0.5 M DTBQ in DME for 10, 30, and 60 minutes. FIG. 2d depicts the first-charge-capacity contour plot with electrolyte concentration and reaction time variations. FIG. 2e depicts charge/discharge voltage curves of a full cell with the relithiated cathode (1 hour in the 0.5M DTBQ in DME) and $Li_4Ti_5O_{12}$ anode. FIG. 2f depicts a powder SEM image of the relithiated cathode (1 hour in the 0.5M DTBQ in DME).

FIG. 3a, depicts images of the 0.5M DTBQ in DME electrolyte with lithium inside and the Li metal after the relithiation reaction. FIG. 3b depicts FTIR spectra of a pure DME solvent and the 0.5M DTBQ in DME electrolyte before and after exposure to lithium. FIG. 3c depicts C is and Li is XPS spectra of the Li metal before and after the relithiation reaction.

DETAILED DESCRIPTION

Figures 2A, 2B, 2C, 2D, 2E, 2F:
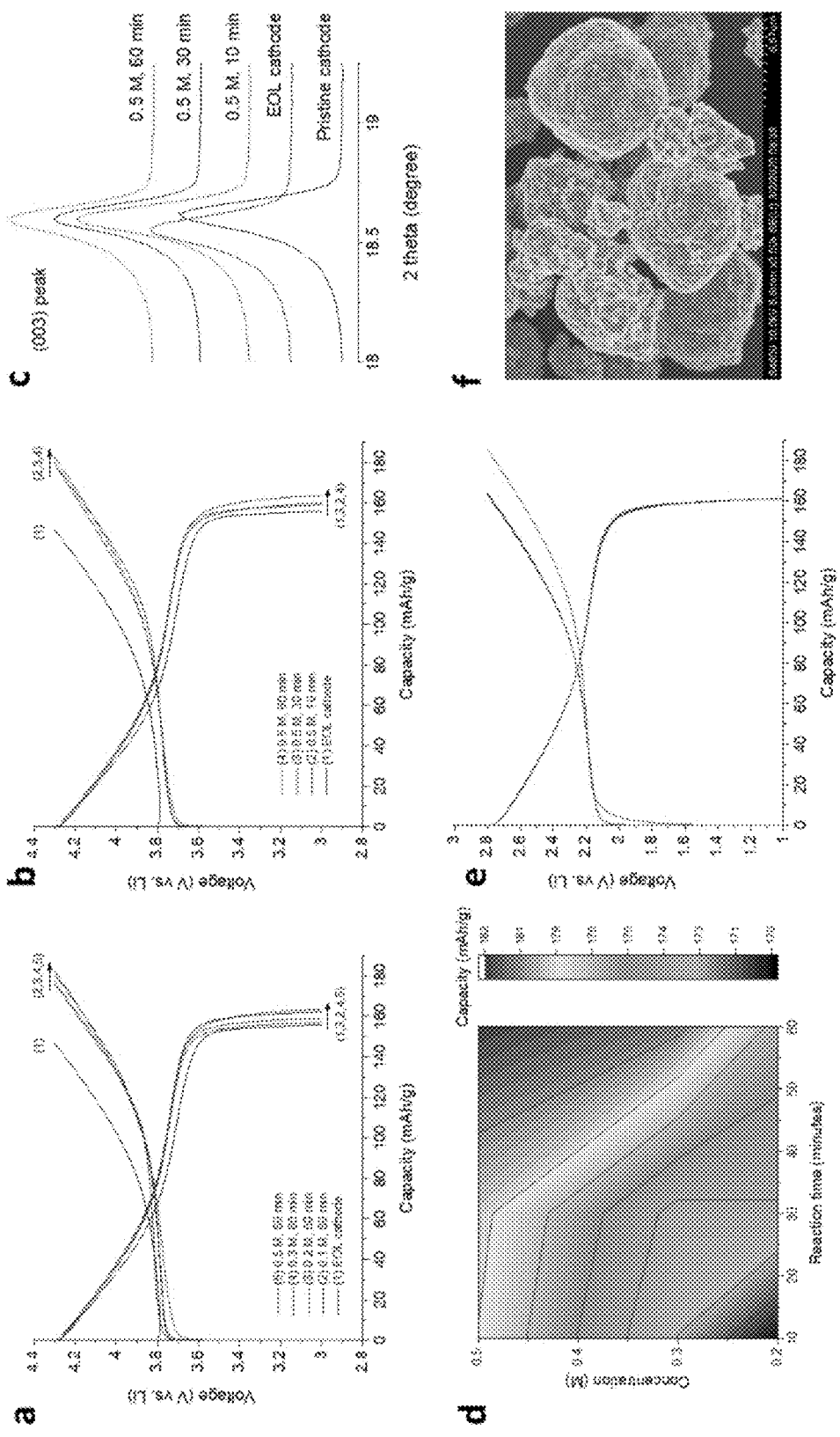
FIGS. 2a, 2b, 2c, 2d, 2e, and 2f depict impacts of process conditions on the relithiation of the end-of-life cathode using compositions and methods disclosed herein.

Increased electric vehicle adoption portends an unprecedented amount of lithium-ion battery wastes in the near future. Since the cathode materials have the highest economic and engineering values, it is essential to recycle and reuse the end-of-life (EOL) cathode materials. The direct cathode recycling approach is distinguished from the traditional transition metal recovery efforts via energy-intensive pyrometallurgy and hydrometallurgy where the engineering value of the cathode cannot be preserved. Key characteristics of the aged cathode materials are loss of the lithium inventory, presence of the cathode-electrolyte interphase film, and mechanical degradation of the secondary particles. It is required to develop a direct cathode recycling method to resolve all these critical technical issues.

Disclosed herein are scalable powder relithiation processes. It was discovered that redox mediators can relithiate EOL cathode powder efficiently at room temperature. It was also discovered that redox mediators can deliver lithium ions and electrons from a lithium source (e.g. Li metal) to the cathode, efficiently relithiate the end-of-life cathode materials and be made ready for second use. In an embodiment, disclosed herein are quinone-based redox mediators, especially 3,5-di-tert-butyl-o-benzoquinone (DTBQ) that shuttle the charges very fast between Li metal and EOL cathode. Reduction of DTBQ on lithium is evidenced by chemistry changes of Li metal and DTBQ, and successful relithiation of EOL cathode by the subsequent oxidation of DTBQ is verified with electrochemical and structural evaluations.

Redox mediators and methods of use are disclosed herein that enable autonomous room-temperature relithiation processes without external process controls. Using low-cost alternatives to DTBQ, the redox mediators and methods disclosed herein are faster, and more reversible than previously available methods and compositions. If the redox mediator cost could be lowered to $100/kg, then recycled cathode (e.g. LiNi$_{1/3}$Co$_{1/3}$Mn$_{1/3}$O$_2$) is cheaper than $10/kg. Moreover, excellent chemical stability of redox mediators is the key to reuse the redox mediator for multiple batch reactions and to lower total recycling cost.

Disclosed herein are novel methods of recycling lithium cathodes that utilize lithium insertion in an efficient way (cost, time, energy perspectives). In an embodiment, disclosed herein is a method for recycling cathode materials from the end-of-life rechargeable lithium batteries. A critical component of cathode recycling is to fill lithium ions back to the crystal structure efficiently because the cathode materials (the lithium source in the battery cell) lose lithium ions by irreversible side reactions over time. Using methods disclosed herein, the initial lithium vacancy concentrations aren't a concern because the voltage is controlled by choosing the right redox mediators. In an embodiment, the method is a room temperature process, so there is no need to increase temperature and pressure, which save energy and money. The reactors can be designed to be a continuous process or a large-scale batch process.

In an embodiment, as disclosed herein, the redox mediators deliver lithium ions and electrons from the anode (e.g. Li metal) to the cathode materials with lithium vacancies. The cathode materials take the lithium-ions/electrons and fill the lithium vacancies. The redox mediators diffuse back to the anode and bring the lithium to the cathode, acting like charge shuttles. Advantages of methods disclosed herein include that it is an autonomous process, so no need to control any electrochemical parameters. In an embodiment, another advantage is that the selection of redox mediators will decide the cell voltage, shuttling kinetics, and materials stability, there are abundant choices of available redox mediators. In an embodiment, another advantage is that the process generates very little waste. In an embodiment, another advantage is that the process doesn't produce another waste stream for recycling. In an embodiment, another advantage is that the process is very easy to scale up.

Relithiation with Redox Mediators

As depicted in FIG. 1a and summarized in the equations 1 and 2, the redox mediators are reversible charge shuttles in an electrochemical cell and deliver Li-ions and electrons from the anode (e.g. Li metal) to the cathode materials with Li deficiencies. The anode as a Li source is not limited to the Li metal but can be any lithiated anode materials. For example, commercial graphite (Li$_x$C$_6$) and high-energy-density Si anode (Li$_x$Si$_y$) in the EOL batteries can be used as the Li source and recycled. The reduced redox mediators by the anode are then oxidized at the cathode surface, transferring Li$^+$/e$^-$ to form fully lithiated cathode. The electrochemical potential of a given redox mediator will determine the lithiation voltage, so that the degree of Li deficiency of the starting EOL cathode is not needed to design and proceed the reaction. The selection of redox mediators will also govern shuttling kinetics and materials stability at the interface. Here, we have tested non-transition-metal-based organic redox mediators, especially quinone-based small molecules. Quinone families typically have redox potentials at 2-3 V vs. Li/Li$^+$ that are ideal for full discharge of cathode materials and do not leave any transition-metal and halide contaminations on the cathode materials.

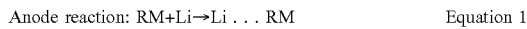

Anode reaction: RM+Li→Li . . . RM            Equation 1

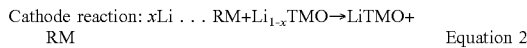

Cathode reaction: xLi . . . RM+Li$_{1-x}$TMO→LiTMO+ RM            Equation 2

Where RM is a redox mediator, LiTMO is a lithiated transition metal oxide cathode.

In an embodiment, electrochemical cells with EOL cathode and Li metal anode were tested. The open-circuit voltage (OCV) was monitored at room temperature without any external current as shown in FIG. 1b. All the redox mediators have lowered the cell OCVs to their equilibrium voltages, but the voltage transition time directly depends on the type of redox mediators. 3,5-di-tert-butyl-o-benzoquinone (DTBQ) lowers the cell OCV instantaneously to the equilibrium value whereas duroquinone takes longer than a day. The kinetic difference is because of not only diffusion of the redox mediators in the electrolyte but also formation of the solid-electrolyte interphase (SEI) film at the electrode surface. To verify relithiation of EOL cathode, the cathode was collected and tested in a half cell (Methods). FIG. 1c shows initial charge/discharge voltage curves of EOL cathode and the relithiated cathode with DTBQ. The EOL cathode exhibits 146 mAh/g during charge (Li extraction) because of the Li deficiency, but after the relithiation, the cathode shows 171 mAh/g. The result demonstrates that redox mediators shuttle between Li source and EOL cathode and enable the relithiation.

Powder Relithiation Process

The next step is to develop a scalable relithiation process with EOL cathode powder since EOL cathode is available as a black mass form. Here, the upstream processes have separated the EOL cathode for relithiation. The EOL cathode powder was agitated in a redox-mediator electrolyte with the Li metal that was covered with a porous polypropylene membrane to prevent any direct contact. The porous membrane allows facile diffusion of the redox mediator molecules through it but blocks the crossover of the cathode materials and Li source. DTBQ was examined in the powder process because it effectively relithiates the EOL cathode during a short period of time and has a good chemical stability against lithium.

Control experiments were performed by changing DTBQ concentrations and reaction time. DTBQ was dissolved in DME, and the resulting concentrations are 0.1, 0.2, 0.3, and 0.5 M. With each electrolyte, the EOL cathode powder was relithiated for 10, 30, and 60 minutes at room temperature. After the reaction, the cathode powder was collected and washed with fresh DME solvent. Then, the powder was annealed at 850° C. for 4 h. The post heat-treatment is beneficial to restore microstructure of secondary particles because mechanical cracking is a serious material issue in the aged cathode powder. The redox mediator, quinone molecules only have light elements (C, H, O) that are fully evaporated during the annealing and do not leave residues on the cathode powder.

FIG. 2a shows the first-cycle charge/discharge voltage curves of the cathode samples after the 1-hour reaction with 0.1, 0.2, 0.3, and 0.5M DTBQ electrolytes. The EOL cathode shows the highest overvoltage during charge and the lowest charging capacity of 146.5 mAh/g. As the redox mediator concentration increases, the overvoltage decreases and the charging capacity increases. The cathode powder relithiated with the 0.5M DTBQ electrolyte shows the lowest overvoltage and the highest charging capacity of 182.5 mAh/g, which is comparable to the pristine cathode material. The higher overvoltage values from the lower concentration batches are probably due to a minor structural disorder induced by Li vacancies during the post annealing.

The effect of the relithiation reaction time on the electrochemical properties was also tested. The DTBQ concentration was set to 0.5 M, and the time was changed to 10, 30, and 60 minutes. A longer reaction time of 1 hour delivers the highest capacity, but a shorter reaction time of 10 minutes also looks promising for full relithiation as its initial charging capacity is 179.1 mAh/g. The degree of relithiation is also evidenced by the (003) X-ray diffraction peak shift that represents the changes in the interslab distance of a layered structure. Compared to the pristine cathode, (003) peak of the EOL cathode shifts to a lower angle as shown in FIG. 2c, which means a higher interslab distance according to the Bragg law. The electrostatic repulsion between oxide ions across the slabs in the presence of Li vacancies is responsible for this change. However, after relithiation, the (003) peaks clearly shift back to the original position, which is a strong evidence of the elimination of Li vacancies. The whole concentration and reaction time matrix, and FIG. 2d, shows the first-charge-capacity contour plot of the relithiated cathode materials. It indicates that the degree of relithiation (i.e. the first-charge capacity) is proportional to the examined reaction parameters (the redox-mediator concentration and the reaction time). With a concentrated electrolyte, the reaction time can be lowered to achieve a target relithiation, and a high throughput process can be achieved. Although a dilute electrolyte may increase the reaction time, it lowers the material cost at the same time. Therefore, the reaction parameters can be determined based on the materials and processing cost analysis.

FIG. 2e shows charge/discharge voltage curves of a full cell with the relithiated cathode (1 hour in the 0.5M DTBQ in DME) and $Li_4Ti_5O_{12}$ anode. The initial charge capacity is 185.2 mAh/g, and the discharge capacity is 161.2 mAh/g. The values are consistent with the half cell data, and it eliminates any ambiguities in the verification of the relithiation concept arising from the Li metal anode in the half cell format. Moreover, the cathode powder after the relithiation exhibits well-preserved secondary particles in FIG. 2f, which reflects a gentle reaction condition of this relithiation process.

Relithiation Mechanism

Figures 3A, 3B, 3C:
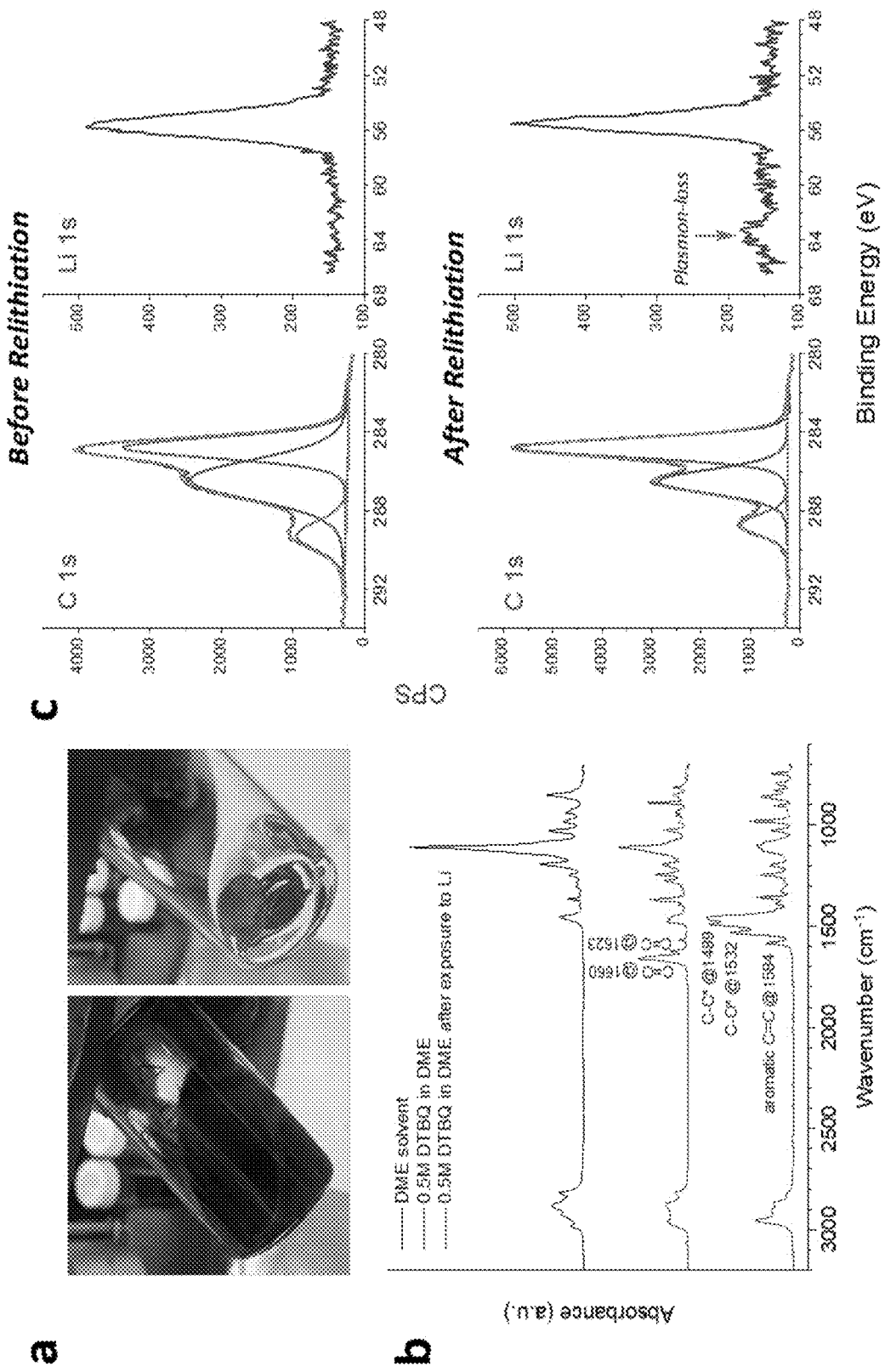
FIGS. 3a, 3b and 3c depict a reaction mechanism behind the redox-mediator-assisted relithiation.
Figure 4:
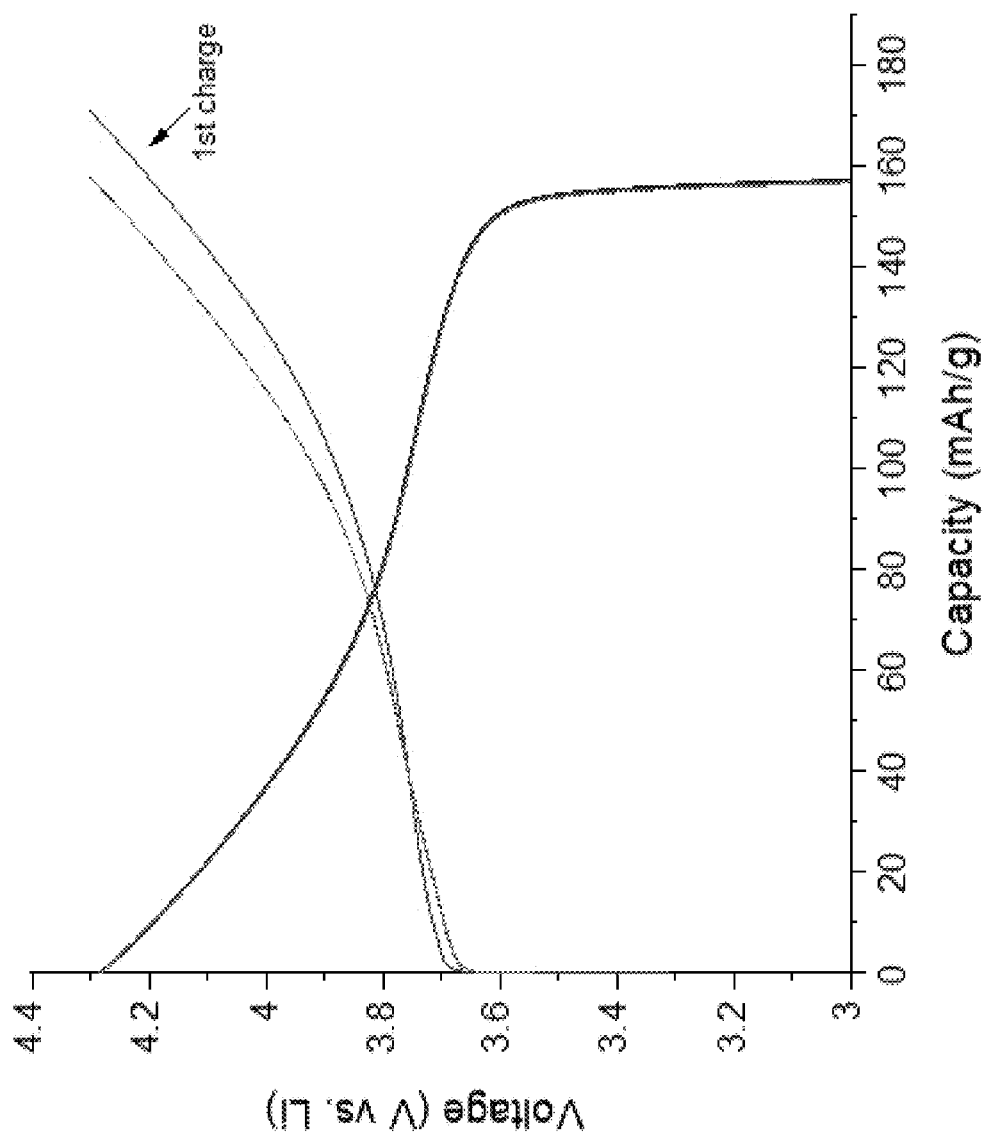
FIG. 4 depicts the charge/discharge voltage curves of the relithiated EOL cathode by the 0.5M DTBQ in DME electrolyte. The relithiation was done in a coin cell as shown in FIG. 1b. The relithiaed EOL cathode was collected and rinsed. A new coin half-cell was assembled to test electrochemistry of the cathode. The cell was cycled four times at 3.0-4.3V vs. $Li/Li^+$ window with C/10 current density.

To understand the chemical process behind this redox-mediator-assisted relithiation, Fourier transform infrared spectroscopy (FTIR) testing was conducted on the electrolyte and X-ray photoelectron spectroscopy (XPS) test on the Li metal. First, FTIR analysis demonstrates reduction of DTBQ by lithium. The color of DTBQ electrolyte is dark yellow after full dissolution, but it changes to dark blue after contact with lithium as shown in FIG. 3a. FTIR spectra of pure DME and the corresponding DTBQ electrolytes before and after contact with lithium are shown in FIG. 3b. The signatures of C═O and C═C bonds of DTBQ are well observed at 1660 and 1623 $cm^{-1}$, respectively. However, after the color change to blue, those peaks disappear, and C—O* and C—C* radical peaks as well as aromatic C═C peak show up. The radical peaks appear due to the coordination of oxygen atoms by Li ions, and the aromatic C═C peak originates from the reduction of quinones. The results indicate the reduction of DTBQ by $Li^+/e^-$ at the Li surface.

XPS analysis demonstrates the dissolution of lithium by DTBQ shown in FIGS. 3a and 3c show C is and Li is XPS spectra of the lithium foil before and after a relithiation reaction. In both cases, the color of DTBQ electrolyte is dark blue. The C is peaks were deconvoluted into three subpeaks of C—C (284.8 eV), C—O (about 286 eV), and O—C═O (about 289 eV). Two changes after the relithiation are (1) the O—C═O peak shift to a lower binding energy and (2) smaller intensity and full width at half maximum (FWHM) values of the C—O and O—C═O peaks. The O—C═O peaks shift from 289.27 to 288.73 eV. The FWHM of the C—O peak decreased from 2.42 to 1.45 eV. The relative intensities of the C—O and O—C═O peaks compared to the C—C peak are decreased from 72.3 and 28.0 to 50.1 and 21.0%, respectively. The results suggest that the reaction cleaned the Li metal so that a less amount of solid-electrolyte interphase (SEI) film is observed. Moreover, after the reaction, the Li is XPS spectrum shows a distinct plasmon-loss feature at about 64 eV that is associated with pure metallic Li with a limited SEI coverage. The XPS results confirm that the reduction of DTBQ takes lithium from the Li surface and leaves bare Li surface with minimal SEI, which further evidences the proposed reaction mechanism in FIG. 1a and equation 1.

Table 1 shows the first-cycle charge/discharge capacities of the cathode samples. Pristine Li[NiMnCo]$_{1/3}$O$_2$ shows 184 mAh/g during charge, but the EOL cathode, Li$_{0.9}$[NiMnCo]$_{1/3}$O$_2$ only exhibits 146 mAh/g because of the Li deficiency. After the relithiation reaction with redox mediators, the charge capacities of all the samples have increased and are higher than that of the EOL cathode, which means that the redox mediator delivers lithium from the Li source to the EOL cathode.

Table 1 depicts the first-cycle charge/discharge capacities of the relithiated cathode by various redox mediators as shown in FIG. 1. The pristine and EOL cathode results are listed as reference.

TABLE 1

| Cathode | Redox mediator electrolyte | First charge capacity (mAh/g) | First discharge capacity (mAh/g) |
|---|---|---|---|
| Li[NiMnCo]$_{1/3}$O$_2$ | — | 184 | 162 |
| Li$_{0.9}$[NiMnCo]$_{1/3}$O$_2$ | — | 146 | 156 |
| Relithiated EOL cathode | 0.5M p-Benzoquinone in DME | 149 | 151 |
| | 0.5M Thymoquinone in DME | 159 | 149 |
| | 0.5M Methyl-p-benzoquinone in DME | 163 | 153 |
| | 0.5M Duroquinone in DME | 176 | 159 |
| | 0.5M 1,4-Naphthoquinone in DME | 161 | 148 |
| | 0.5M 3,5-di-tert-butyl-o-benzoquinone in DME | 171 | 157 |

Another point is that DTBQ and duroquinone efficiently relithiate the cathode, and the initial charge capacities are higher than 170 mAh/g. The different capacities with redox mediators are due to differences in charge transfer kinetics, the diffusion of redox mediators in the electrolyte, and the electrochemical stability at the electrode interface. For example, some redox mediators (e.g. 2,5-di-tert-butyl-1,4-benzoquinone) form thick solid-electrolyte interphase (SEI) films on the Li anode and exhibit poor electrochemical properties. Some redox mediators (e.g. p-Benzoquinone) leaves residue on the cathode after the reaction, which increases cell overvoltage during charging.

In another embodiment, methods disclosed herein are for the electrochemical relithiation which include a first step of forming an electrode with the end-of-life batteries, and a second step of making a battery cell, and third step of applying a current so that the cathode receives lithium ions from the counter electrode (=Li metal).

Table 2 shows an embodiment of the various properties and measurements of the performance of DBBQo.

TABLE 2

| Capacity | DBBQo in DME | Chem Delith | Pristine |
|---|---|---|---|
| 1st C cap (mAh/g) | 175 | 146 | 184 |
| 1st D Cap (mAh/g) | 160 | 156 | 162 |
| 1st Cycle Eff (%) | 91.8 | 106.4 | 88 |
| Reversible C Cap (mAh/g) | 161 | 159 | 163 |
| Reversible D Cap (mAh/g) | 160 | 157 | 162 |
| Irreversible Cap Loss (mAh/g) | 14 | −10 | 21.4 |
| Irreversible Cap Loss (%) | 8.2 | −7.0 | 11.6 |

After the RM reaction, the electrode was rinsed and put into a new coin cell w/DBBQo electrolyte (no RM).

The quinones tested in this work are p-benzoquinone (reagent grade, ≥98%), thymoquinone (≥98%), methyl-p-benzoquinone (≥98%), duroquinone (≥97%), 1,4-naphthoquinone (≥97%), 1,2-naphthoquinone (≥97%), 2-methoxy-1,4-naphthoquinone (≥98%), 2,5-di-tert-butyl-1,4-benzoquinone (≥99%), and 3,5-di-tert-butyl-o-benzoquinone (DTBQ, ≥98%). All the chemicals were purchased from Sigma-Aldrich and used without further purification.

In addition to the information depicted in FIG. 1b, the 2,5-di-tert-butyl-1,4-benzoquinone forms a thick yellow SEI film on the Li metal, which is why there was no OCV change in FIG. 1b. The resulting cathode did not have any relithiation. DTBQ is stable against the Li metal, and the Li metal does not show a notable color change or passivation. The surface chemistry of the Li metal was further characterized with XPS (see FIG. 3c), and the results confirm that DTBQ is stable against lithium. This is a reason why the DTBQ electrolyte induced the instantaneous OCV drop of a half cell. In an embodiment, thymoquinone reacts with the Li metal and forms uneven SEI films.

In an embodiment, pieces of Li metal foil were sealed inside the bag that is made of Celgard separator and the Li metals were reacted for 10, 30, and 60 minutes of relithiation reaction with 0.5M DTBQ in DME electrolyte. The Li metals were taken out of the Li bag after the reaction and rinsed with pure DME solvent for analysis.

For the relithiation of the EOL cathode powder, it is useful to prepare a redox-mediator electrolyte. To design control experiments, the electrolyte was chemically reduced with lithium first so that the reduced electrolyte starts the relithiation reaction as soon as the EOL cathode powder is added. Dark yellow color was observed from the 0.5M DTBQ electrolyte. However, once it reacts with the Li metal, it turns to dark blue. The Li metal also shows pitting corrosion on the surface. The degree of the pitting corrosion appears to be proportional to the electrolyte concentration and storage time. The bare Li metal strips were added only to reduce DTBQ and removed from the DTBQ electrolyte before the relithiation reaction.

Figure 5:
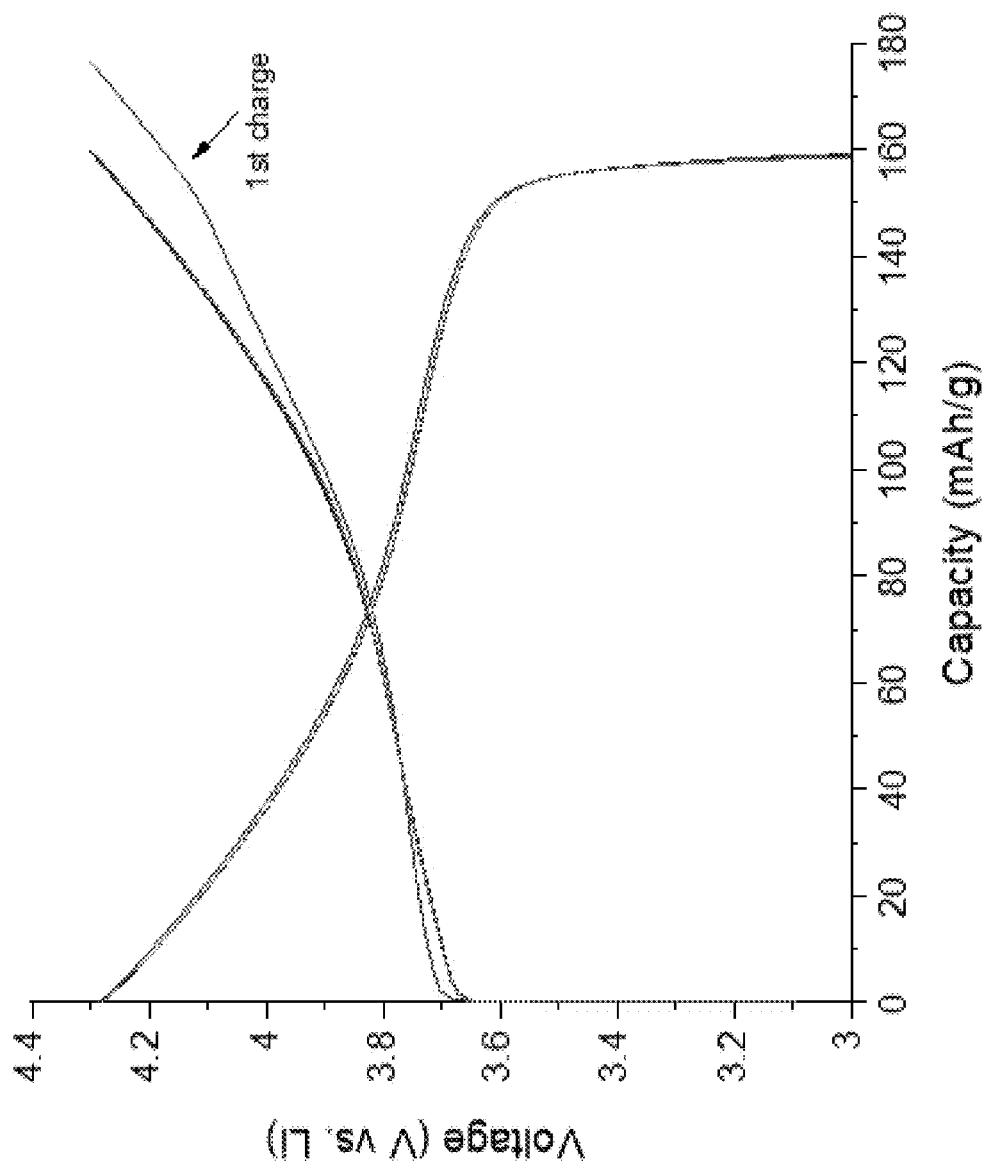
FIG. 5 depicts the charge/discharge voltage curves of the relithiated EOL cathode by the 0.5M Duroquinone in DME electrolyte. The relithiation was done in a coin cell as shown in FIG. 1b. The relithiaed EOL cathode was collected and rinsed. A new coin half-cell was assembled to test electrochemistry of the cathode. The cell was cycled four times at 3.0-4.3V vs. $Li/Li^+$ window with C/10 current density.
Figure 6:
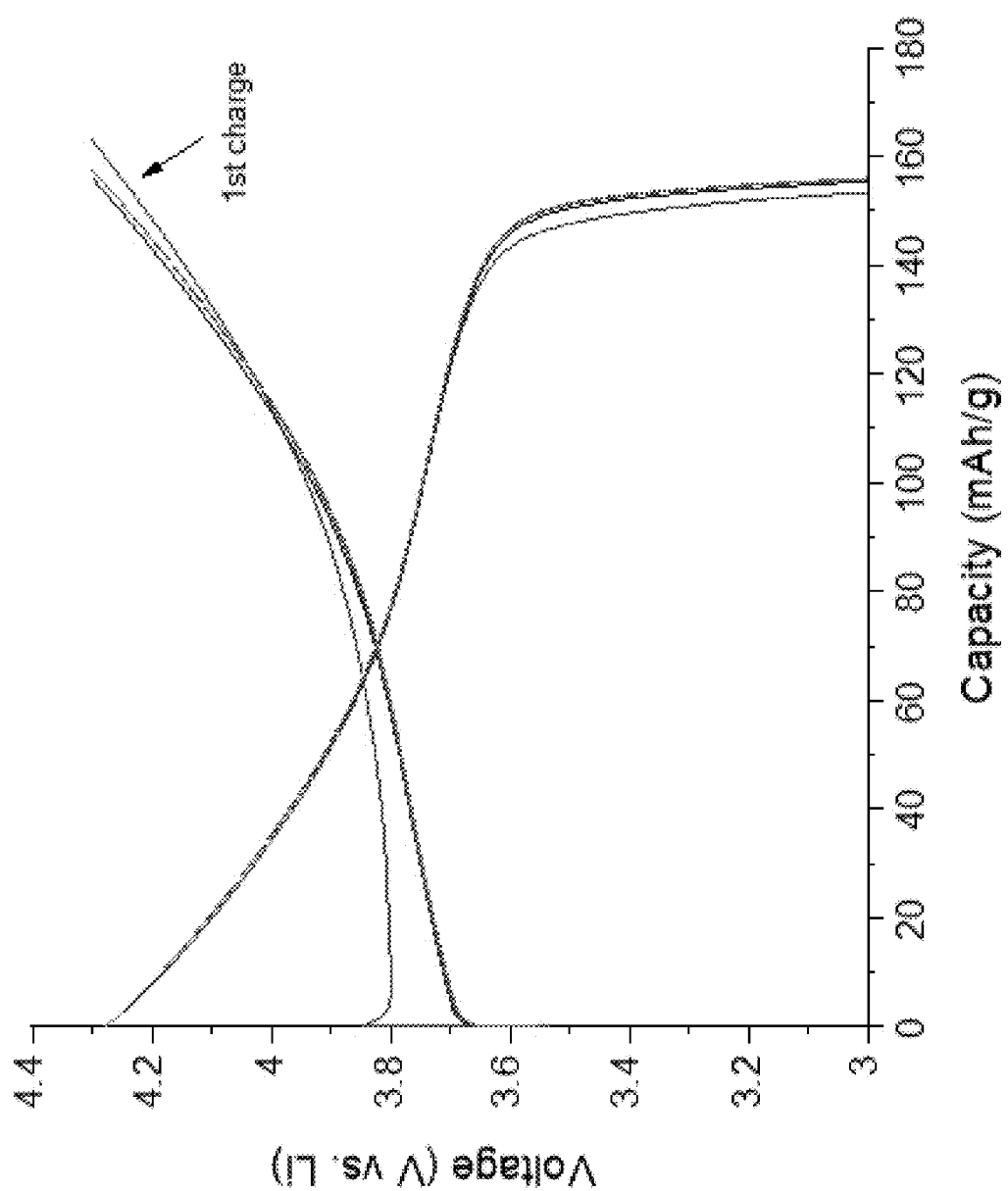
FIG. 6 depicts the charge/discharge voltage curves of the relithiated EOL cathode by the 0.5M Methyl-p-benzoquinone in DME electrolyte. The relithiation was done in a coin cell as shown in FIG. 1b. The relithiaed EOL cathode was collected and rinsed. A new coin half-cell was assembled to test electrochemistry of the cathode. The cell was cycled four times at 3.0-4.3V vs. $Li/Li^+$ window with C/10 current density.
Figure 7:
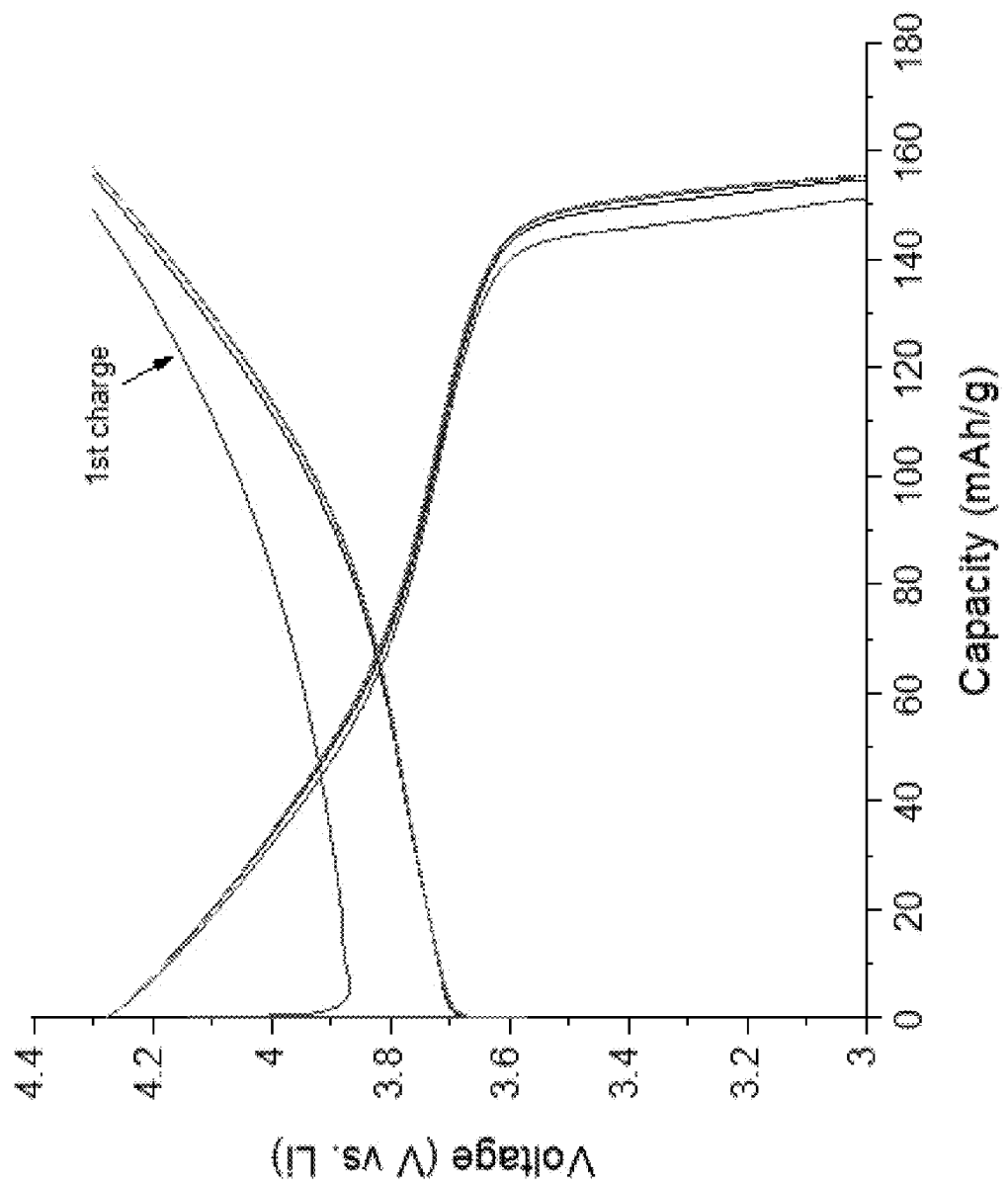
FIG. 7 depicts the charge/discharge voltage curves of the relithiated EOL cathode by the 0.5M p-Benzoquinone in DME electrolyte. The relithiation was done in a coin cell as shown in FIG. 1b. The relithiaed EOL cathode was collected and rinsed. A new coin half-cell was assembled to test electrochemistry of the cathode. The cell was cycled four times at 3.0-4.3V vs. Li/Li$^+$ window with C/10 current density.
Figure 8:
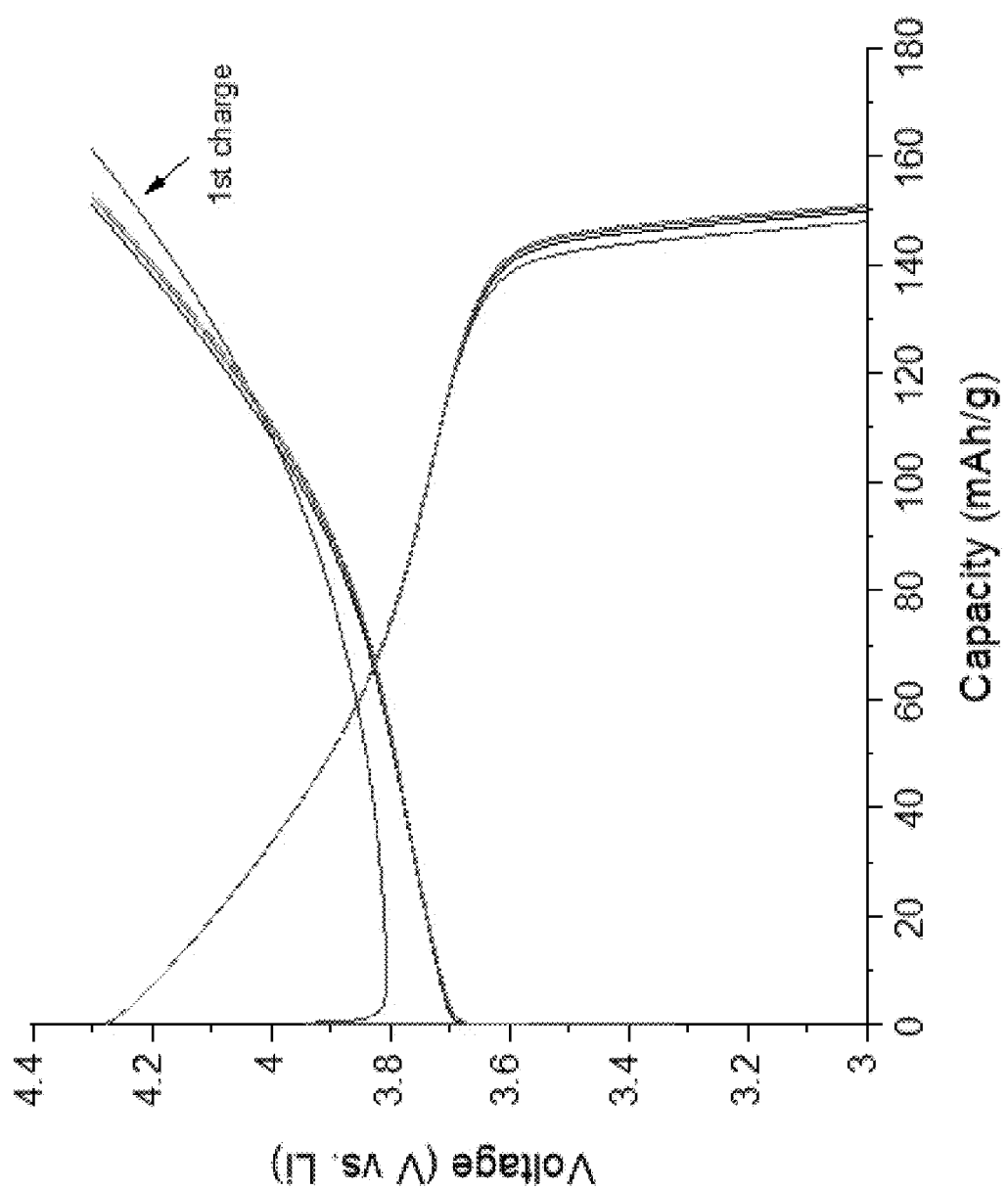
FIG. 8 depicts the charge/discharge voltage curves of the relithiated EOL cathode by the 0.5M 1,4-Naphthoquinone in DME electrolyte. The relithiation was done in a coin cell as shown in FIG. 1b. The relithiaed EOL cathode was collected and rinsed. A new coin half-cell was assembled to test electrochemistry of the cathode. The cell was cycled four times at 3.0-4.3V vs. Li/Li$^+$ window with C/10 current density.
Figure 9:
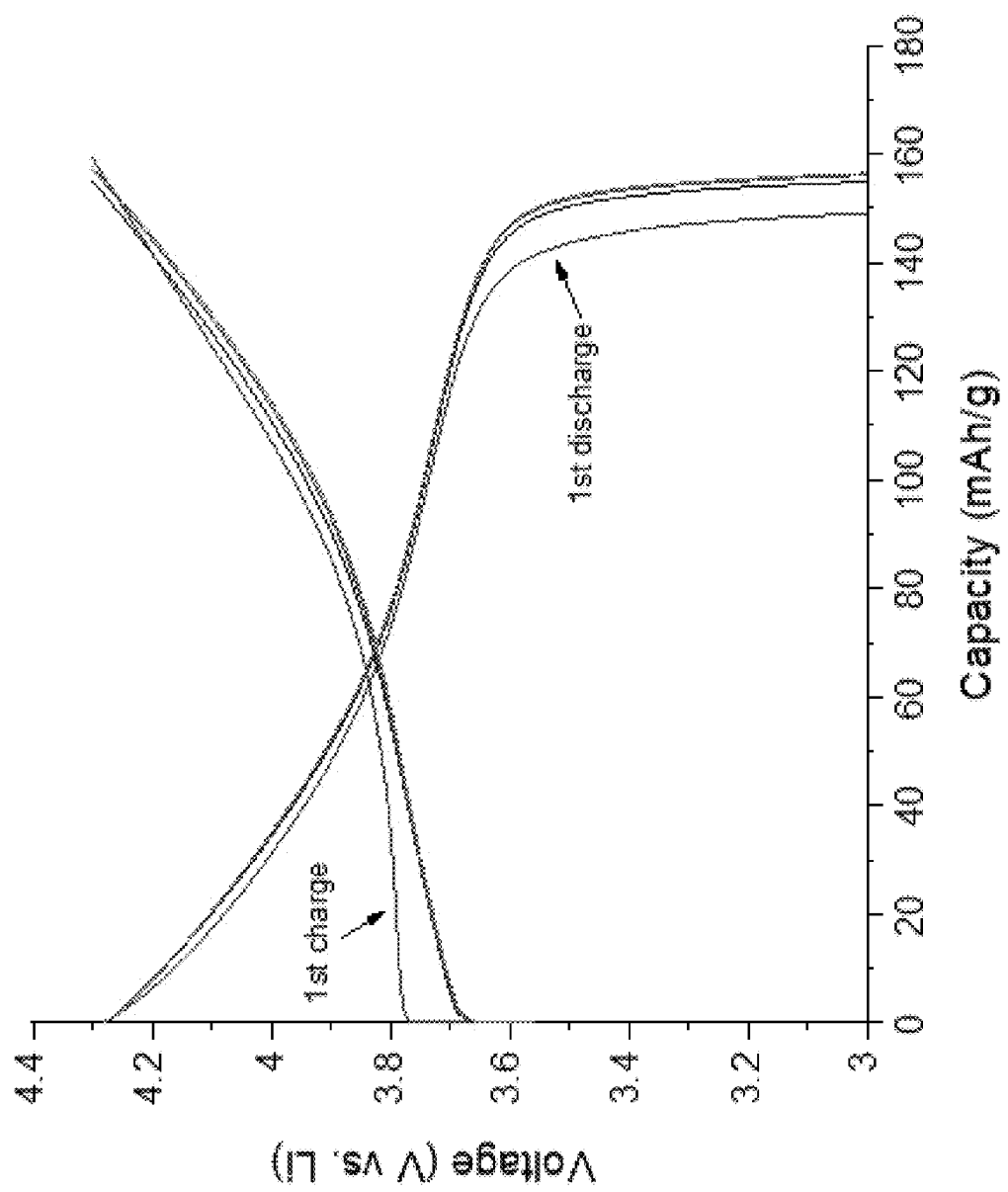
FIG. 9 depicts the charge/discharge voltage curves of the relithiated EOL cathode by the 0.5M Thymoquinone in DME electrolyte. The relithiation was done in a coin cell as shown in FIG. 1b. The relithiaed EOL cathode was collected and rinsed. A new coin half-cell was assembled to test electrochemistry of the cathode. The cell was cycled four times at 3.0-4.3V vs. Li/Li$^+$ window with C/10 current density.

The Li bag was added to the chemically reduced DTBQ electrolyte (see FIG. 5, for example) together with the EOL cathode powder for the relithiation reaction. The Celgard separator is porous enough to permeate the liquid electrolyte and also perfectly prevents crossover of the cathode powder. Li metal is light and floating on the electrolyte, which also minimize the chance of direct contact between the Li bag and the EOL cathode powder. After the relithiation reaction, the Li metal was collected and rinsed with pure DME as shown in the figure above. It exhibits corrosion that is more visible after a longer time reaction.

The foregoing disclosure has been set forth merely to illustrate the invention and is not intended to be limiting.

I claim:

1. A method for recycling lithium cathodes from batteries comprising:
   providing a battery,
   removing a lithium containing cathode from said battery,
   contacting the lithium containing cathode with a redox mediator;
   wherein the redox mediator is selected from the group consisting of 3,5-di-tert-butyl-o-benzoquinone, thymoquinone, methyl-p-benzoquinone, duroquinone, and naphthoquinone, in order to recover lithium.

2. The method of claim 1 capable of taking place at room temperature.

3. The method of claim 1 wherein the cathode is $Li[NiMnCo]_{1/3}O_2$.

4. The method of claim 1 wherein the cathode is $Li_{0.9}[NiMnCo]_{1/3}O_2$.

5. The method of claim 1 wherein the redox mediator is dissolved in an electrolyte.

6. The method of claim 5 wherein the electrolyte is dimethyl ether (DME).

7. The method of claim 1 further comprising using a cathode powder that is agitated in a redox-mediator electrolyte with the Li metal covered with a porous polypropylene membrane wherein the redox mediator is selected from the group consisting of 3,5-di-tert-butyl-o-benzoquinone, thymoquinone, methyl-p-benzoquinone, duroquinone, and naphthoquinone.

8. The method of claim 7 wherein the cathode is $Li[NiMnCo]_{1/3}O_2$.

9. The method of claim 7 wherein the cathode is $Li_{0.9}[NiMnCo]_{1/3}O_2$.

10. The method of claim 7 wherein the electrolyte is dimethyl ether (DME).

11. The method of claim 7 capable of taking place at room temperature.

* * * * *